(12) United States Patent
Zhu et al.

(10) Patent No.: US 11,174,524 B1
(45) Date of Patent: Nov. 16, 2021

(54) PRODUCTION APPARATUS AND METHOD FOR ELECTRIC ARC FURNACE STEELMAKING WITH FULLY CONTINUOUS ULTRA-SHORT PROCESS

(71) Applicant: University of Science and Technology Beijing, Beijing (CN)

(72) Inventors: Rong Zhu, Beijing (CN); Bohan Tian, Beijing (CN); Kai Dong, Beijing (CN); Guangsheng Wei, Beijing (CN); Rongfang Su, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 17/124,506

(22) Filed: Dec. 17, 2020

(30) Foreign Application Priority Data

May 14, 2020 (CN) .......................... 202010406632.3

(51) Int. Cl.
   *C21B 13/12* (2006.01)
   *F27B 3/19* (2006.01)
   *F27B 3/08* (2006.01)
   *H05B 6/18* (2006.01)

(52) U.S. Cl.
   CPC .............. *C21B 13/125* (2013.01); *F27B 3/19* (2013.01); *F27B 3/085* (2013.01); *H05B 6/18* (2013.01)

(58) Field of Classification Search
   CPC .......... C21B 13/125; F27B 3/19; F27B 3/085; H05B 6/18
   USPC ..... 75/10.15, 10.14, 10.19, 10.32, 433, 509, 75/957; 266/200, 171, 900
   See application file for complete search history.

(56) References Cited

U.S. PATENT DOCUMENTS

| | | | | |
|---|---|---|---|---|
| 4,023,962 A | * | 5/1977 | Nakagawa | C21C 5/567 75/10.17 |
| 4,419,128 A | * | 12/1983 | Nakagawa | C21C 5/567 75/382 |
| 4,456,476 A | * | 6/1984 | Sherwood | C21B 13/085 75/509 |
| 4,696,458 A | * | 9/1987 | Royzman | C21C 5/567 164/270.1 |

(Continued)

*Primary Examiner* — Scott R Kastler
*Assistant Examiner* — Michael Aboagye
(74) *Attorney, Agent, or Firm* — Bayramoglu Law Offices LLC

(57) ABSTRACT

A production apparatus and method for electric arc furnace steelmaking with a fully continuous ultra-short process are provided. A continuous adding, melting, smelting and continuous casting of a metal material are integrated, and a metallurgy process is completed in a flowing of a molten steel, to realize a continuous production of ingot blanks. The production apparatus includes four operation sites of an electric arc furnace for melting and primary refining, a sealed tapping chute for molten steel flowing, a refinement storage bed for molten-steel desulfurization and alloying and a conticaster for continuous casting A material flow, an energy flow and a time stream in the four operation sites are in a dynamic equilibrium. The production apparatus and method realize a molten-steel casting is started within 120 minutes after the metal material is started to be continuously added, and an uninterrupted continuous production is maintained for above 80 hours.

3 Claims, 2 Drawing Sheets

(56) References Cited

U.S. PATENT DOCUMENTS

| | | | | |
|---|---|---|---|---|
| 5,171,357 A | * | 12/1992 | Aguirre | C22B 4/00 |
| | | | | 75/10.19 |
| 6,155,333 A | * | 12/2000 | Vallomy | C21C 5/527 |
| | | | | 164/476 |
| 7,618,582 B2 | * | 11/2009 | Peaslee | C21C 5/567 |
| | | | | 266/215 |

* cited by examiner

PRODUCTION APPARATUS AND METHOD FOR ELECTRIC ARC FURNACE STEELMAKING WITH FULLY CONTINUOUS ULTRA-SHORT PROCESS

CROSS-REFERENCE TO RELATED APPLICATIONS

This application is based upon and claims priority to Chinese Patent Application No. 202010406632.3, filed on May 14, 2020, the entire contents of which are incorporated herein by reference.

TECHNICAL FIELD

The present disclosure relates to the technical field of steelmaking, and particularly relates to a production apparatus and method for electric arc furnace steelmaking with a fully continuous ultra-short process.

BACKGROUND

Currently, the production from a metal material to ingot blanks mainly relies on electric arc furnace steelmaking systems. Such a system has three working procedures of electric arc furnace steelmaking, refinement and continuous casting. Modern electric arc furnace steelmaking systems realize the continuous production of ingot blanks by using a continuous-casting apparatus. However, the smelting and transportation are still a process of opened intermittent production, wherein the temperature loss of the molten steel is considerable, and the time waste between the working procedures is serious.

Smelting production apparatuses such as electric arc furnaces and ladle furnaces have different operation approaches at different stages of smelting. However, because the condition inside the furnaces is complicated, that cannot be accurately determined, and the operation mainly relies on the experience of the workers, which results in a high operation error and instable production. Moreover, the conditions inside the furnace at different stages of smelting are different, and the temperature and the components vary largely, and are distributed non-uniformly inside the furnace, which results in the problems such as serious erosion of the refractory materials and superheat damage of the apparatus, and affects the life of the furnace body.

The electric arc furnace steelmaking systems employ intermitted and discontinuous ladles that sequentially enter the production operation sites, and finally perform the continuous production of ingot blanks by using a continuous-casting apparatus. The ladle transferring process inevitably generates the conditions such as un-smooth linking between the working procedures, ladle to ladle, and exposure to air of the molten steel, which results in the problems such as a large temperature fall in the molten steel and a high contents of [N] and [H] in the molten steel, and results in high electricity-power consumption and material consumption of the smelting, a low production efficiency, a poor product quality and a high production cost.

SUMMARY

An object of the present disclosure is to overcome the disadvantages of the current apparatuses and processes for electric arc furnace steelmaking systems, by providing a production apparatus and method for electric arc furnace steelmaking with a fully continuous ultra-short process having good stability and efficiency, a low cost, a high quality and a long life, which can realize stable production, shorten the tap-to-tap period of the product, reduce the energy consumption and the material consumption of the smelting, improve the quality of products, and prolong the equipment life.

A production apparatus for electric arc furnace steelmaking with a fully continuous ultra-short process, wherein the production apparatus comprises four operation sites of an electric arc furnace, a sealed tapping chute, a refinement storage bed and a conticaster, respectively for melting and primary refining, molten steel flowing, molten-steel desulfurization and alloying, and continuous casting;

material flow, energy flow and time stream in the operation sites are in dynamic equilibrium;

the electric arc furnace, the refinement storage bed and the conticaster are arranged from higher to lower, a tapping hole of the electric arc furnace located at a higher position is connected to a higher-position end of the refinement storage bed located at a lower position via the sealed tapping chute, and the conticaster is located below a lower-position end of the refinement storage bed, and is connected via the tapping hole;

sizes of the electric arc furnace, the sealed tapping chute, the refinement storage bed and the conticaster are matched;

materials, energies, times and temperatures in the electric arc furnace, the sealed tapping chute, the refinement storage bed and the conticaster are matched and dynamically linked;

the electric arc furnace, the sealed tapping chute, the refinement storage bed and the conticaster are arranged from higher to lower in space;

after the smelting is started, a metal material is continuously added into the electric arc furnace, to complete melting and dephosphorization;

a carbon powder and a silicon powder are jetted into the sealed tapping chute as reducing-agent powders; and refining is performed at the higher-position end of the refinement storage bed, to complete desulfurization and alloying, and the molten steel that has been refined is stored and heated at the lower-position end of the refinement storage bed, and continuously flows into the conticaster, to obtain an ingot blank, to realize fully continuous steelmaking.

The present disclosure can realize that the molten-steel casting is started within the 120 minutes after the metal material is started to be continuously added, and the uninterrupted continuous production is maintained for above 80 hours, which reduces the loss in the energy and the time in the smelting process. By using the present disclosure, the output is increased by above 20% as compared with conventional processes, and the contents of the harmful elements in the ingot blanks such as [P], [S], [O], [N] and [H] satisfy the requirements on high-quality steel products. Regarding one ton of the steel, the electricity-power consumption is reduced by 50 kWh, and the energy consumption is reduced by above 20 kgce.

Optionally, the electric arc furnace comprises a continuously feeding device, a furnace door, a furnace-wall coherent oxygen lance, electrodes, a tapping mechanism and a temperature measuring and sampling device;

the continuously feeding device is a shaft or horizontal continuously feeding device;

the furnace door is located at a furnace wall of the electric arc furnace, and is able to discharge slag in the smelting process;

the furnace-wall coherent oxygen lance is installed at a suitable position of a side wall of the electric arc furnace, and functions to flux the metal material, blow and form slag;

the electrodes are inserted into the electric arc furnace via a top end of the electric arc furnace;

the tapping mechanism employs a principle of siphon, and is able to realize slag-free tapping; and the temperature measuring and sampling device is located over a tapping hole of the tapping mechanism, and is able to monitor in real time a temperature and components of tapped molten steel.

Optionally, the sealed tapping chute is of a sealed structure, and comprises a chute main body, an upper through hole, a powder jetting device and a lower through hole;

the chute main body is constructed by using a refractory material;

the upper through hole is a molten-steel flow-in end, and is connected to the tapping hole of the electric arc furnace;

the powder jetting device is inserted into the chute main body, and jets the carbon powder and the silicon powder as the reducing-agent powders to a steel flow; and the lower through hole is a molten-steel flow-out end, and is connected to the refinement storage bed, and the lower through hole protrudes below a liquid level of the molten steel in the refinement storage bed.

Optionally, the refinement storage bed is of a sealed structure, and comprises a bottom-blowing element, a charging hole, a flue, a vacuum slag cleaner, an induction coil, a plasma gun, a tapping linking device, a tapping hole and a slag hole;

the refinement storage bed is constructed by using a refractory material, is arranged in a form of a vertical step, and has one end connected to the sealed tapping chute as the higher-position end, and one end connected to the conticaster as the lower-position end;

the bottom-blowing element is at a bottom of the refinement storage bed;

the charging hole is arranged at a top of the refinement storage bed; or the temperature measuring and sampling device or a charging tube protrudes into the refinement storage bed via the charging hole;

the flue is located at a top of the refinement storage bed;

the vacuum slag cleaner is located behind a last one charging hole at one end adjacent to the conticaster of a top of the refinement storage bed, and contacts a slag surface;

the induction coil and/or the plasma gun are arranged at a bed wall of the refinement storage bed;

the tapping linking device is located at the lower-position end of the refinement storage bed, is able to store an amount of molten steel, and has a cushioning effect, wherein a slag dam is provided at a connection between the tapping linking device and the higher-position end of the refinement storage bed, and is able to realize slag-free tapping;

the tapping hole is located at one end of a bottom of the refinement storage bed that is adjacent to the conticaster, and is connected to the conticaster; and the slag hole is an opening at a furnace wall of the refinement storage bed.

The present disclosure further provides a production method for electric arc furnace steelmaking with a fully continuous ultra-short process, by using the production apparatus for electric arc furnace steelmaking with a fully continuous ultra-short process, wherein the production method comprises, in a smelting process, adding a metal material by the continuously feeding device into the electric arc furnace, and melting and primarily refining to become molten steel;

the molten steel entering and flowing in the sealed tapping chute;

the molten steel flowing into the refinement storage bed, and undergoing molten-steel desulfurization and alloying, to reach qualified temperature and components;

the molten steel that has been refined flowing into the conticaster, and undergoing continuous casting, to finally obtain a qualified ingot blank; and in the smelting process, in the electric arc furnace, by blowing oxygen and supplying electricity by using the furnace-wall coherent oxygen lance and the electrodes, melting the metal material and heating, and in the refinement storage bed, heating the molten steel by using the induction coil and/or the plasma gun.

Optionally, the production method comprises, by using the production apparatus for electric arc furnace steelmaking with a fully continuous ultra-short process, continuously adding the metal material into the electric arc furnace, to complete melting and dephosphorization;

jetting a carbon powder and a silicon powder into the sealed tapping chute as reducing-agent powders;

refining at the higher-position end of the refinement storage bed, to complete desulfurization and alloying, and the molten steel that has been refined being stored and heated at the lower-position end of the refinement storage bed, and continuously flowing into the conticaster, to form an ingot blank, to realize fully continuous steelmaking; and the detailed process is as follows:

T0-T1 stage: a stage in which the metal material is continuously added into the electric arc furnace;

T1-T2 stage: a stage in which the metal material melts in the electric arc furnace into molten steel, completes oxidative dephosphorization, and flows into the sealed tapping chute;

T2-T3 stage: a stage in which the molten steel is deoxidized in the sealed tapping chute and flows to the refinement storage bed;

T3-T4 stage: a stage in which the molten steel flows in the higher-position end of the refinement storage bed, undergoes refinement, and completes desulfurization and alloying; and T4-T5 stage: a stage in which the molten steel that has been refined enters the lower-position end of the refinement storage bed, and is injected into a crystallizer of the conticaster to form an ingot blank.

Optionally, a duration of the T0-T1 stage is controlled within 5-10 min;

a duration of the T1-T2 stage is controlled within 20-50 min;

a duration of the T2-T3 stage is controlled within 5-10 min;

a duration of the T3-T4 stage is controlled within 20-50 min; and a duration of the T4-T5 stage is controlled within 10-60 min.

Optionally, in the T0-T1 stage:

the detailed process is: adding the metal material by the continuously feeding device into the electric arc furnace.

Optionally, in the T1-T2 Stage:

the detailed process is: the electrodes descending, and being electrified to melt the metal material, turning on the furnace-wall coherent oxygen lance to flux or form slag to assist in the smelting, the furnace door automatically discharging slag, measuring the temperature and components of the molten steel by using the temperature measuring and sampling device at a tapping area of the electric arc furnace, further turning on the tapping mechanism to tap, and the molten steel flowing into the sealed tapping chute.

Optionally, in the T2-T3 stage:

the detailed process is: the molten steel flowing in the sealed tapping chute, and according to the temperature and components of the molten steel at the tapping area of the electric arc furnace, jetting the carbon powder and the silicon powder as the reducing-agent powders to the steel flow by using the powder jetting device.

Optionally, in the T3-T4 Stage:

the detailed process is: performing argon blowing and stirring by using the bottom-blowing element; by using the charging hole, measuring the temperature of the molten steel and adding a smelting auxiliary material, and according to a particular condition of the molten steel, performing a different feeding operation at a next charging hole;

heating and stirring the molten steel by using the induction coil and/or the plasma gun, and heating the molten steel and homogenizing the temperature and components; and automatically removing molten slag by using the vacuum slag cleaner or the slag hole.

Optionally, in the T4-T5 Stage:

the detailed process is: controlling the molten steel to reach a predetermined standard of the temperature and components, and feeding into the crystallizer of the conticaster to form an ingot blank.

Optionally, the production method comprises, when the smelting is started, filling up the electric arc furnace with the metal material, and after the metal material in the electric arc furnace has completely melted into the molten steel, opening the tapping mechanism of the electric arc furnace and maintaining the opened state;

the molten steel increasingly flowing into the refinement storage bed via the sealed tapping chute, performing refinement, removing in time the molten slag by using the vacuum slag cleaner or the slag hole to prevent the molten slag from entering the lower-position end of the refinement storage bed, and when the tapping linking device of the refinement storage bed is full of the molten steel, opening the tapping hole and maintaining the opened state;

the finished molten steel continuously flowing into the conticaster via the tapping hole, to obtain a finished steel billet; and subsequently realizing uninterrupted production of an ingot blank from the molten steel.

Optionally, the production apparatus and method for electric arc furnace steelmaking with a fully continuous ultra-short process are based on a 30-300 t electric arc furnace.

Optionally, because the electric arc furnace, the refinement storage bed and the conticaster are arranged from higher to lower, the height of the factory building is greater than the height of the factory building of ordinary electric arc furnaces by 5-20 m.

The advantageous effects of the present disclosure are as follows:

a) The production apparatus according to the present disclosure comprises four operation sites of an electric arc furnace, a sealed tapping chute, a refinement storage bed and a conticaster, respectively for melting and primary refining, molten steel flowing, molten-steel desulfurization and alloying, and continuous casting; and material flow, energy flow and time stream in the operation sites are in dynamic equilibrium. The present disclosure can realize stable production, shorten the tap-to-tap period of the product, reduce the energy consumption and the material consumption of the smelting, improve the quality of products, and prolong the equipment life.

b) The present disclosure can realize fully continuous steelmaking. After the smelting is started, a metal material is continuously added into the electric arc furnace, to complete melting, dephosphorization and so on; a carbon powder, a silicon powder and so on are jetted into the sealed tapping chute as reducing-agent powders; and refining is performed at the higher-position end of the refinement storage bed, to complete desulfurization, alloying and so on, and the molten steel that has been refined is stored and heated at the lower-position end of the refinement storage bed, and continuously flows into the conticaster, to form an ingot blank.

c) The present disclosure can realize that the molten-steel casting is started within the 120 minutes after the metal material is started to be continuously added, and the uninterrupted continuous production is maintained for above 80 hours, which reduces the loss in the energy and the time in the smelting process. By using the present disclosure, the output is increased by above 20% as compared with conventional processes, and the contents of the harmful elements in the ingot blanks such as [P], [S], [O], [N] and [H] satisfy the requirements on high-quality steel products. Regarding one ton of the steel, the electricity-power consumption is reduced by 50 kWh, and the energy consumption is reduced by above 20 kgce.

Figure 1:
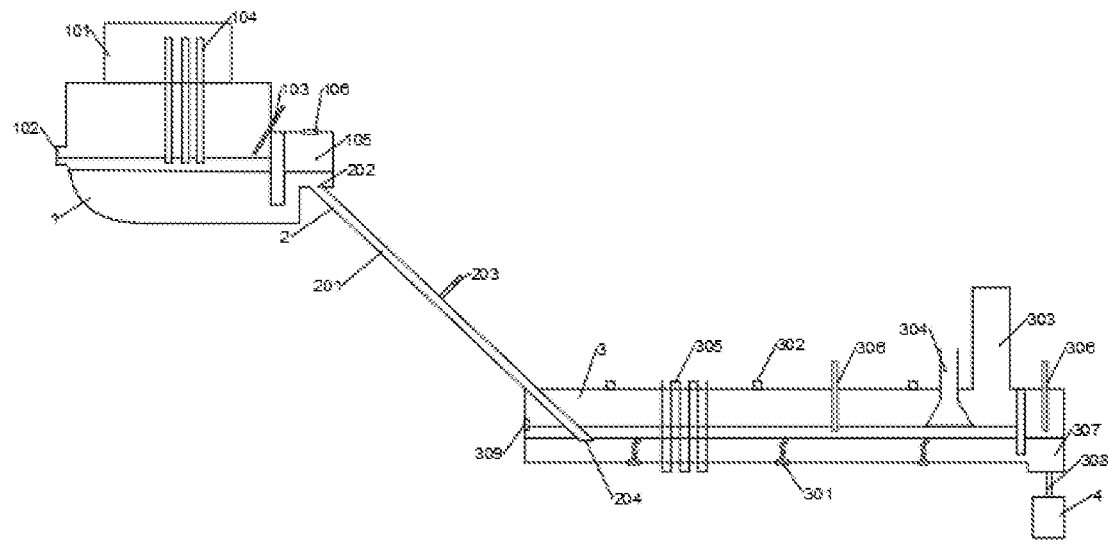
FIG. 1 shows a schematic structural diagram of a vertical cross section of the production apparatus for electric arc furnace steelmaking with a fully continuous ultra-short process according to an embodiment of the present disclosure.

In the drawings: 1—electric arc furnace; 101—continuously feeding device; 102—furnace door; 103—furnace-wall coherent oxygen lance; 104—electrodes; 105—tapping mechanism; 106—temperature measuring and sampling device; 2—sealed tapping chute; 201—chute main body; 202—upper through hole; 203—powder jetting device; 204—lower through hole; 3—refinement storage bed; 301—bottom-blowing element; 302—charging hole; 303—flue; 304—vacuum slag cleaner; 305—induction coil; 306—plasma gun; 307—tapping linking device; 308—tapping hole; 309—slag hole; and 4—conticaster.

DETAILED DESCRIPTION OF THE EMBODIMENTS

The particular embodiments of the present disclosure will be described in detail below with reference to the drawings. It should be noted that the technical features or the combination of the technical features described in the following embodiments should not be considered as self-existing, and they may be combined to achieve better technical effects. In the drawings of the following embodiments, the same reference numbers in the drawings represent the same elements or components, and can be applied to different embodiments.

Figure 2:
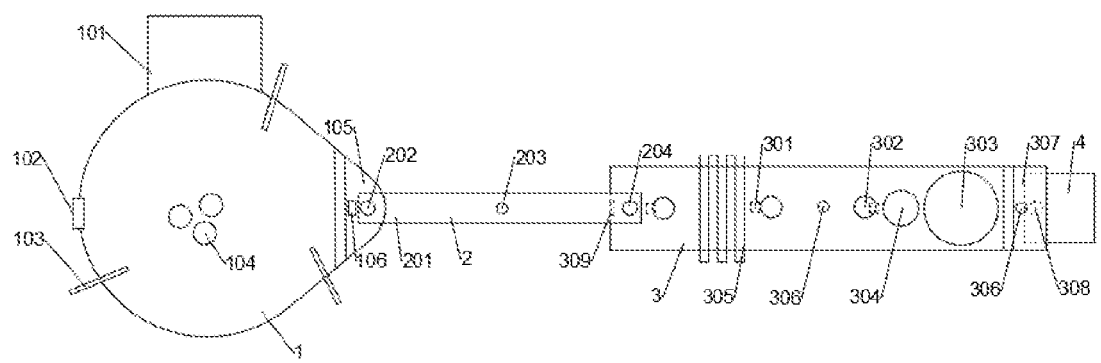
FIG. 2 shows a schematic diagram of a planar structure of the production apparatus for electric arc furnace steelmaking with a fully continuous ultra-short process according to an embodiment of the present disclosure.
Figure 3:
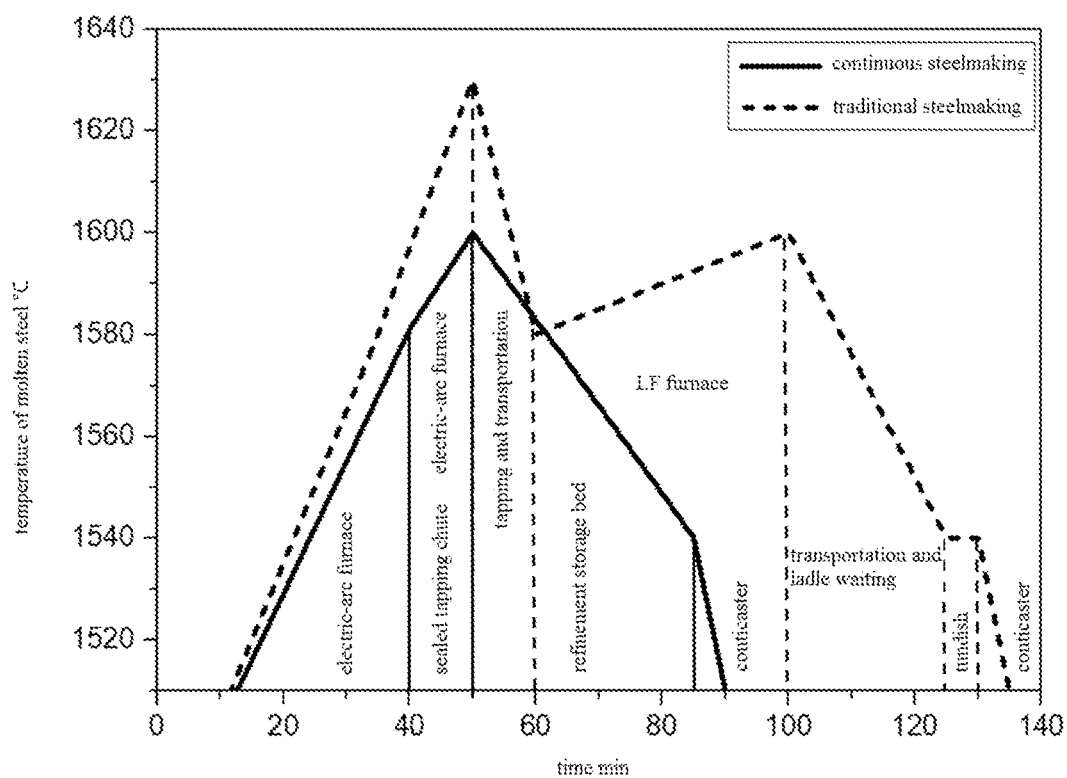
FIG. 3 shows a flow chart of the smelting of the production apparatus for electric arc furnace steelmaking with a fully continuous ultra-short process according to Example 1 of the present disclosure, and a process of the smelting of a conventional electric arc furnace steelmaking system for comparison.

As shown in FIGS. 1-3, a production apparatus for electric arc furnace steelmaking with a fully continuous ultra-short process comprises an electric arc furnace 1, a sealed tapping chute 2, a refinement storage bed 3 and a conticaster 4. The electric arc furnace 1, the refinement storage bed 3 and the conticaster 4 are arranged from higher to lower, an electric arc furnace 1 tapping hole located at a higher position is connected to a higher-position end of the refinement storage bed 3 located at a lower position via the sealed tapping chute 2, and the conticaster 4 is located below the lower-position end of the refinement storage bed 3, and is connected via the tapping hole 308. The sizes of the electric arc furnace 1, the sealed tapping chute 2, the refinement storage bed 3 and the conticaster 4 are matched.

The electric arc furnace 1 comprises a continuously feeding device 101, a furnace door 102, a furnace-wall coherent oxygen lance 103, electrodes 104, a tapping mechanism 105 and a temperature measuring and sampling device 106. The continuously feeding device 101 is a shaft or horizontal continuously feeding device. The furnace door 102 is located at a furnace wall of the electric arc furnace, and is able to discharge slag in the smelting process. The furnace-wall coherent oxygen lance 102 is installed at a suitable position of the side wall of the electric arc furnace, and functions to flux the metal material, blow, form slag and so on. The electrodes 103 are inserted into the electric arc furnace via a top end of the electric arc furnace. The tapping mechanism 105 employs the principle of siphon, and is able to realize slag-free tapping. The temperature measuring and sampling device 106 is located over the tapping hole of the tapping mechanism, and is able to monitor in real time the temperature and components of tapped molten steel.

The sealed tapping chute 2 is of a sealed structure, and comprises a chute main body 201, an upper through hole 202, a powder jetting device 203 and a lower through hole 204. The chute main body 201 is constructed by using a refractory material. The upper through hole 202 is the molten-steel flow-in end, and is connected to the tapping hole of the electric arc furnace 1. The powder jetting device 203 is inserted into the chute main body, and jets a carbon powder, a silicon powder and so on as reducing-agent powders to the steel flow. The lower through hole 204 is the molten-steel flow-out end, and is connected to the refinement storage bed 3, and the lower through hole 204 protrudes below the liquid level of the molten steel in the refinement storage bed.

The refinement storage bed 3 is of a sealed structure, and comprises a bottom-blowing element 301, a charging hole 302, a flue 303, a vacuum slag cleaner 304, an induction coil 305, a plasma gun 306, a tapping linking device 307, a tapping hole 308 and a slag hole 309. The refinement storage bed 3 is constructed by using a refractory material, is arranged in the form of a vertical step, and has one end connected to the sealed tapping chute 2 as the higher-position end, and has one end connected to the conticaster 4 as the lower-position end. The bottom-blowing element 301 is at a bottom of the refinement storage bed. The charging hole 302 is arranged at the top of the refinement storage bed. Optionally, the temperature measuring and sampling device or a charging tube protrudes into the refinement storage bed via the charging hole 302. The flue 303 is located at the top of the refinement storage bed. The vacuum slag cleaner 304 is located behind the last one charging hole at one end adjacent to the conticaster of the top of the refinement storage bed, and contacts the slag surface. The induction coil 305 and/or the plasma gun 306 are arranged at the bed wall of the refinement storage bed. The tapping linking device 307 is located at the lower-position end of the refinement storage bed, is able to store an amount of molten steel, and has a cushioning effect. A slag dam is provided at the connection between the tapping linking device 307 and the higher-position end of the refinement storage bed 3, and is able to realize slag-free tapping. The tapping hole 308 is located at one end of the bottom of the refinement storage bed that is adjacent to the conticaster, and is connected to the conticaster 4. The slag hole 309 is an opening at the furnace wall of the refinement storage bed.

The method comprises, in a smelting process, adding a metal material by the continuously feeding device 101 into the electric arc furnace 1, and melting and primarily refining to become molten steel; the molten steel entering and flowing in the sealed tapping chute 2; the molten steel flowing into the refinement storage bed 3, and undergoing molten-steel desulfurization and alloying, to reach qualified temperature and components; and the molten steel that has been refined flowing into the conticaster 4, and undergoing continuous casting, to finally obtain a qualified ingot blank.

Optionally, the production method comprises, in the smelting process, in the electric arc furnace 1, by blowing oxygen and supplying electricity by using the furnace-wall coherent oxygen lance 103 and the electrodes 104, melting the metal material and heating, and in the refinement storage bed 3, and heating the molten steel by using the induction coil 305 and/or the plasma gun 306.

Example 1

In this Example, the method according to the present disclosure is applied to a 150 t production apparatus for electric arc furnace steelmaking with a fully continuous ultra-short process according to the present disclosure for smelting production. The sizes of the devices are:

The capacity of the electric arc furnace is 150 t. The sealed tapping chute is a circular tube having a length of 3 m and an inner diameter of 0.3 m. The internal space of the higher-position end of the refinement storage bed has a length of 4 m, a width of 1 m and a height of 2 m, and the internal space of the lower-position end of the refinement storage bed has a length of 1 m, a width of 1 m and a height of 2.5 m. The height difference between the higher-position end and the lower-position end of the refinement storage bed is 0.5 m. The conticaster is a 2-machine 6-flow 200×200 mm billet caster.

The Detailed Process is:

(1) 0-5 min: a stage in which the metal material is continuously added into the electric arc furnace;

wherein the detailed process is: adding the metal material into the electric arc furnace by using the horizontal continuously feeding device;

(2) 5-40 min: a stage in which the metal material melts in the electric arc furnace into molten steel, completes oxidative dephosphorization, and flows into the sealed tapping chute;

wherein the detailed process is: the electrodes descending, and being electrified to melt the metal material, turning on the furnace-wall coherent oxygen lance to flux or form slag to assist in the smelting, the furnace door automatically discharging slag, measuring the temperature and components of the molten steel by using the temperature measuring and sampling device at a tapping area of the electric arc furnace, further turning on the tapping mechanism to tap, and the molten steel flowing into the sealed tapping chute; and when the smelting is started, filling up the electric arc furnace with cold-charge metal material, and after the metal material in the electric arc furnace has completely melted into the molten steel, opening the tapping mechanism and maintaining the opened state;

(3) 40-50 min: a stage in which the molten steel is deoxidized in the sealed tapping chute and flows to the refinement storage bed;

wherein the detailed process is: the molten steel flowing in the sealed tapping chute, and according to the temperature and components of the molten steel at the tapping area of the electric arc furnace, jetting a carbon powder, a silicon powder and so on as reducing-agent powders to the steel flow by using the powder jetting device;

(4) 50-85 min: a stage in which the molten steel flows in the higher-position end of the refinement storage bed, undergoes refinement, and completes desulfurization and alloying;

wherein the detailed process is: performing argon blowing and stirring by using the bottom-blowing element; by using the charging hole, measuring the temperature of the molten steel and adding a smelting auxiliary material, and according to a particular condition of the molten steel, performing a different feeding operation at a next charging hole; heating and stirring the molten steel by using the induction coil and/or the plasma gun, and heating the molten steel and homogenizing the temperature and components; automatically removing molten slag by using the vacuum slag cleaner or the slag hole; and when the smelting is started, after the tapping mechanism of the electric arc furnace has been opened, the molten steel increasingly flowing into the refinement storage bed via the sealed tapping chute, performing refinement, removing in time the molten slag by using the vacuum slag cleaner or the slag hole to prevent the molten slag from entering the lower-position end of the refinement storage bed, and when the tapping linking device of the refinement storage bed is full of the molten steel, opening the tapping hole and maintaining the opened state; and (5) 85-90 min: a stage in which the molten steel that has been refined enters the lower-position end of the refinement storage bed, and is injected into a crystallizer of the conticaster to form an ingot blank;

wherein the detailed process is: controlling the molten steel to reach a predetermined standard of the temperature and components, and feeding into the crystallizer of the conticaster to form an ingot blank.

By using the above method, the molten-steel casting is started at the 90 minutes after the metal material is started to be continuously added, and the uninterrupted continuous production is maintained for 100 hours, which reduces the loss in the energy and the time in the smelting process. The output is increased by 40% as compared with conventional processes, and the contents of the harmful elements in the ingot blanks such as [P], [S], [O], [N] and [H] satisfy the requirements on high-quality steel products. Regarding one ton of the steel, the electricity-power consumption is reduced by 50 kWh, and the energy consumption is reduced by 20 kgce.

Although the present disclosure has provided embodiments of the present disclosure, a person skilled in the art should understand that the embodiments of the present disclosure may be modified without departing from the spirit of the present disclosure. The above embodiments are merely illustrative, and the scope of the present disclosure should not be limited to the embodiments of the present disclosure.

What is claimed is:

1. A production apparatus for an electric arc furnace steelmaking with a fully continuous process, comprising four operation sites, wherein the four operation sites are an electric arc furnace for melting and primary refining, a sealed tapping chute for molten steel flow out of the electric arc furnace, a refinement storage bed for molten-steel desulfurization and alloying and a conticaster for continuous casting;

a material flow, an energy flow and a time stream in the four operation sites are in a dynamic equilibrium;

the electric arc furnace, the refinement storage bed and the conticaster are arranged from a higher position to a lower position respectively, a tapping hole of the electric arc furnace located at a higher position is connected to a higher-position end of the refinement storage bed located at a lower position via the sealed tapping chute, and the conticaster is located below a lower-position end of the refinement storage bed, and the conticaster is connected via the tapping hole;

sizes of the electric arc furnace, the sealed tapping chute, the refinement storage bed and the conticaster are matched;

materials, energies, times and temperatures in the electric arc furnace, the sealed tapping chute, the refinement storage bed and the conticaster are matched and dynamically linked;

the electric arc furnace, the sealed tapping chute, the refinement storage bed and the conticaster are arranged from a higher position to a lower position spatially;

wherein the electric arc furnace comprises a continuously feeding device, a furnace door, a furnace-wall coherent oxygen lance, electrodes, a tapping mechanism and a temperature measuring and sampling device;

the continuously feeding device is a shaft or a horizontal continuously feeding device;

the furnace door is located at the furnace-wall of the electric arc furnace, and the furnace door discharges slag in the process;

the furnace-wall coherent oxygen lance is installed at a suitable position of a side wall of the electric arc furnace, and wherein the furnace-wall coherent oxygen lance has a function of blowing flux into the metal material to form the slag;

the electrodes are inserted into the electric arc furnace via a top end of the electric arc furnace;

wherein the tapping mechanism is configured as a siphoning unit, so as to achieve a slag-free tapping; and the temperature measuring and sampling device is located over a tapping hole of the tapping mechanism, and the temperature measuring and sampling device monitors a temperature and components of a tapped molten steel in real time.

2. A production apparatus for an electric arc furnace steelmaking with a fully continuous process, comprising four operation sites, wherein the four operation sites are an electric arc furnace for melting and primary refining, a sealed tapping chute for molten steel flow out of the electric arc furnace, a refinement storage bed for molten-steel desulfurization and alloying and a conticaster for continuous casting;

a material flow, an energy flow and a time stream in the four operation sites are in a dynamic equilibrium;

the electric arc furnace, the refinement storage bed and the conticaster are arranged from a higher position to a lower position respectively, a tapping hole of the electric arc furnace located at a higher position is connected to a higher-position end of the refinement storage bed located at a lower position via the sealed tapping chute, and the conticaster is located below a lower-position end of the refinement storage bed, and the conticaster is connected via the tapping hole;

sizes of the electric arc furnace, the sealed tapping chute, the refinement storage bed and the conticaster are matched;

materials, energies, times and temperatures in the electric arc furnace, the sealed tapping chute, the refinement storage bed and the conticaster are matched and dynamically linked;

the electric arc furnace, the sealed tapping chute, the refinement storage bed and the conticaster are arranged from a higher position to a lower position spatially;

wherein the sealed tapping chute is of a sealed structure, and the sealed tapping chute comprises a chute main body, an upper through hole, a powder jetting device and a lower through hole;

the chute main body is constructed by using a refractory material;

the upper through hole is a molten-steel flow-in end, and the upper through hole is connected to the tapping hole of the electric arc furnace;

the powder jetting device is inserted into the chute main body, and the powder jetting device jets the carbon powder and the silicon powder as the reducing-agent powders to a steel flow; and the lower through hole is a molten-steel flow-out end, and the lower through hole is connected to the refinement storage bed, and the lower through hole protrudes below a liquid level of the refined molten steel in the refinement storage bed.

3. A production apparatus for an electric arc furnace steelmaking with a fully continuous process, comprising four operation sites, wherein the four operation sites are an electric arc furnace for melting and primary refining, a sealed tapping chute for molten steel flow out of the electric arc furnace, a refinement storage bed for molten-steel desulfurization and alloying and a conticaster for continuous casting;

a material flow, an energy flow and a time stream in the four operation sites are in a dynamic equilibrium;

the electric arc furnace, the refinement storage bed and the conticaster are arranged from a higher position to a lower position respectively, a tapping hole of the electric arc furnace located at a higher position is connected to a higher-position end of the refinement storage bed located at a lower position via the sealed tapping chute, and the conticaster is located below a lower-position end of the refinement storage bed, and the conticaster is connected via the tapping hole;

sizes of the electric arc furnace, the sealed tapping chute, the refinement storage bed and the conticaster are matched;

materials, energies, times and temperatures in the electric arc furnace, the sealed tapping chute, the refinement storage bed and the conticaster are matched and dynamically linked;

the electric arc furnace, the sealed tapping chute, the refinement storage bed and the conticaster are arranged from a higher position to a lower position spatially;

wherein the refinement storage bed is of a sealed structure, and the refinement storage bed comprises a bottom-blowing element, a charging hole, a flue, a vacuum slag cleaner, an induction coil, a plasma gun, a tapping linking device, a tapping hole and a slag hole;

the refinement storage bed is constructed by using a refractory material, wherein the refinement storage bed is arranged in a form of a vertical step, and the refinement storage bed has a first end connected to the sealed tapping chute as the higher-position end, and a second end connected to the conticaster as the lower-position end;

the bottom-blowing element is at a bottom of the refinement storage bed;

the charging hole is arranged at a top of the refinement storage bed; or the temperature measuring and sampling device or a charging tube protrudes into the refinement storage bed via the charging hole;

the flue is located at the top of the refinement storage bed;

the vacuum slag cleaner is located adjacent to the conticaster at the top of the refinement storage bed, and contacts slag surface;

the induction coil and/or the plasma gun are arranged at a bed wall of the refinement storage bed;

the tapping linking device located at the lower-position end of the refinement storage bed stores an amount of the refined molten steel, and the tapping linking device has a cushioning effect, wherein a slag dam is provided at a connection between the tapping linking device and the higher-position end of the refinement storage bed, and the slag dam a slag-free tapping;

the tapping hole of the refinement storage bed is located at an end of the bottom of the refinement storage bed, wherein the end of the bottom of the refinement storage bed is adjacent to the conticaster, and the tapping hole of the refinement storage bed is connected to the conticaster; and the slag hole is an opening at a furnace wall of the refinement storage bed.

\* \* \* \* \*